(12) United States Patent
Hastwell et al.

(10) Patent No.: US 8,013,023 B2
(45) Date of Patent: Sep. 6, 2011

(54) CHARGED EMULSIONS FOR SITE-SPECIFIC DEPOSITION OF MATTER AT MICRO AND NANO SCALE

(75) Inventors: Peter John Hastwell, North Adelaide (AU); Timothy Mark Kaethner, Crafers (AU)

(73) Assignee: Raustech Pty Ltd, South Australia (AU)

( * ) Notice: Subject to any disclaimer, the term of this patent is extended or adjusted under 35 U.S.C. 154(b) by 1191 days.

(21) Appl. No.: 10/562,175

(22) PCT Filed: Jun. 30, 2004

(86) PCT No.: PCT/AU2004/000863
§ 371 (c)(1),
(2), (4) Date: Mar. 2, 2007

(87) PCT Pub. No.: WO2005/000970
PCT Pub. Date: Jan. 6, 2005

(65) Prior Publication Data
US 2007/0213410 A1    Sep. 13, 2007

(30) Foreign Application Priority Data
Jun. 30, 2003    (AU) .............................. 2003903296

(51) Int. Cl.
*B01F 3/08* (2006.01)
(52) U.S. Cl. ................. 516/31; 516/20; 516/9
(58) Field of Classification Search ............... 516/9, 20, 516/31
See application file for complete search history.

(56) References Cited

U.S. PATENT DOCUMENTS

| | | | |
|---|---|---|---|
| 2,828,180 A * | 3/1958 | Sertorio | 8/607 |
| 3,347,702 A * | 10/1967 | Clancy | 430/134 |
| 6,184,608 B1 | 2/2001 | Cabuz et al. | |
| 6,280,595 B1 | 8/2001 | Montgomery | |
| 6,350,609 B1 | 2/2002 | Morozov et al. | |
| 6,803,092 B2 | 10/2004 | Pocius et al. | |
| 6,855,501 B2 | 2/2005 | Huang | |
| 2002/0094528 A1 | 7/2002 | Salafsky | |
| 2002/0131147 A1 | 9/2002 | Paolini et al. | |
| 2004/0050701 A1 | 3/2004 | McEntee et al. | |
| 2004/0055892 A1 | 3/2004 | Oh et al. | |

FOREIGN PATENT DOCUMENTS

| | | |
|---|---|---|
| JP | 04/086602 | 3/1992 |
| JP | 04-95971 | 3/1992 |
| JP | 2001-064487 | 3/2001 |
| WO | WO0023182 | 4/2000 |
| WO | WO0025936 | 5/2000 |
| WO | WO 01/15800 A1 | 3/2001 |
| WO | WO 02/25936 A2 | 3/2002 |
| WO | WO 03/031067 A1 | 4/2003 |
| WO | WO 03/062456 A1 | 7/2003 |

OTHER PUBLICATIONS

Michael G. Steward et al., "NanoXerography: The Use of Electrostatic Forces to Pattern Nanoparticles", Proceedings of the 2003 NSF Design, Service and Manufacturing Grantees and Research Conference, 7 pgs.

* cited by examiner

*Primary Examiner* — Ling-Siu Choi
*Assistant Examiner* — Chun-Cheng Wang
(74) *Attorney, Agent, or Firm* — Brinks Hofer Gilson & Lione

(57) ABSTRACT

An emulsion including a continuous phase, a discontinuous phase which is immiscible in the continuous phase, and optionally a surfactant, the surfactant has a first part which is compatible with the continuous phase and a second part which is compatible with the discontinuous phase. The continuous phase has a high volume resistivity and the discontinuous phase is electrically charged. The discontinuous phase can be a reagent, a solvent which carries an active chemical reagent or a carrier liquid for a solid or insoluble liquid dispersed in the discontinuous phase. The surfactant, if present, is selected to not significantly reduce the volume resistivity of the continuous phase. The emulsion can also include a charge control agent. The emulsions can be used for the electrostatically controlled placement of matter in a spatially defined manner from the discontinuous phase for combinatorial chemistry and micrometer and nanometer scale deposition with or without reaction.

42 Claims, No Drawings

CHARGED EMULSIONS FOR SITE-SPECIFIC DEPOSITION OF MATTER AT MICRO AND NANO SCALE

FIELD OF INVENTION

This invention relates to novel emulsions and methods of use of such emulsions in the manufacture of chemical substances at micrometer and nanometer scale by spatially selective deposition with or without reaction.

BACKGROUND OF THE INVENTION

The invention will be generally discussed in emulsions which are useful for manufacture of solid phase DNA arrays of the type generally known as DNA chips on substrates particularly planar substrates but the use of the invention is not limited to that particular application but has wider ramifications and the invention is not intended to be limited to the manufacture of such DNA chips.

In its broadest form the invention relates to the emulsion mediated spatially defined deposition of any of a wide variety of chemical substances onto a surface. Substances may include, but are not limited to, coloured materials, dyes, drug molecules, polymers, catalysts, anti-wetting agents, pigments, etching chemicals, layerings and reagents for de-blocking, blocking, derivatisation and activation of solid phase chemical groups. Arrays can include deoxyribonucleic acids (DNA), peptides, peptidenucleic acids (PNA), ribonucleic acids (RNA) and other solid phase chemical arrays and arrays assembled by combinatorial chemistry.

In general the manufacture of DNA chips involves the selective and sequential addition onto a substrate of molecular units each with a protective group which is removed when the next molecular unit is to be added. One such method of manufacturing DNA arrays uses a process known as the phosphoramidite process which uses a trityl group or derivatives of the trityl group as the protective group.

The phosphoramidite process is a repetitive four stage process (deprotection, coupling, capping and oxidation) for the chemical synthesis of polymers particularly sequences of DNA oligonucleotides to form portions of DNA.

In the phosphoramidite process, a portion of DNA in single stranded form is built up by the sequential addition in predetermined order of any one of the four nucleotides (in phosphoramidite form) being the four components which make up DNA, the A, T, G and C nucleotides. Each nucleotide has a chemically removable protecting group on it. A chemical reagent known as a de-protecting agent removes the protecting group exposing a reactive hydroxyl group and in the next stage a nucleotide (in phosphoramidite form) is coupled to the growing DNA string. The next stage is a capping step where any DNA strings which were de-protected but to which a nucleotide was not coupled are permanently capped to prevent unwanted addition of nucleotides from adding to that molecule in later coupling steps. In the fourth and final step, oxidation of the newly formed inter-nucleotide phosphite linkage is carried out to convert the linkage to a phosphotriester. Typically, the de-protecting agent is dichloroacetic or trichloroacetic add.

In the manufacture of DNA arrays a number of different sequence DNA strands are built up on a substrate to enable later biochemical analysis to take place. In this process it is necessary to selectively de-protect various portions of the array and it is particularly to this selective de-protecting that one particular embodiment of the present invention is directed.

Selective de-protecting by direct light-activated chemistry or photo-removable de-protecting techniques has been developed but these are somewhat inefficient resulting in short and impure solid phase oligodeoxynucleotides in rather large unit feature probe sizes of 20 to 50 microns and it is an object of this invention to provide a more efficient chemical de-protecting process.

The applicant has surprisingly found that by the use of electrically charged emulsions which include the chemical de-protecting agent in the discontinuous phase and which are selectively deposited on predefined areas of a planar or other shaped substrate under the influence of an electric field, then more accurate, localised and efficient de-protecting may be possible.

BRIEF DESCRIPTION OF THE INVENTION

In one form therefore the invention is said to reside in a composition of matter including a liquid continuous phase and a liquid discontinuous phase which is substantially immiscible in the continuous phase, characterised by the continuous phase having a high electrical volume resistivity and the discontinuous phase being electrically charged.

Preferably the discontinuous phase includes a compound selected from the group comprising a bio-active agent, a catalyst, a reagent or reactant including an acid and a base, a blocking chemical, a de-blocking chemical, an organic or inorganic derivatisation chemical, a pharmaceutical, a dye or a pigment.

In further form the invention is said to reside in a composition of matter including a liquid continuous phase, a liquid discontinuous phase which is substantially immiscible in the continuous phase and a surfactant, characterised by the continuous phase having a high volume resistivity, the discontinuous phase being electrically charged and the surfactant being selected to not significantly reduce the volume resistivity of the continuous phase.

The term "not significantly reduce the volume resistivity" is intended to mean that the volume resistivity of the continuous phase of the emulsion is not reduced to such an extent that the electrical charge on the substrate or discontinuous phase is ineffective. In such a situation the discontinuous phase may not deposit patternwise under the influence of an electrostatic field.

It may be noted, too, that the choice of discontinuous phase or any of its components should be such that it does not significantly partition into the continuous phase and thereby neither significantly reducing the volume resistivity of the continuous phase nor imparting chemical reactivity to the continuous phase.

Preferably the surfactant is one which has a first part which is compatible with the continuous phase and a second part which is compatible with the discontinuous phase. Hence it may be selected so as to have analogues of the principal components of the continuous phase and the discontinuous phase. The surfactant may also assist with reducing the surface tension of the droplets of the discontinuous phase to assist with wetting of a surface to which they are attracted.

The surfactant may be selected from anionic, cationic, non-ionic or amphoteric, compounds, polymer surfactant materials or phospholipids.

For instance the surfactant may be alcohol/fatty acid esters, alkoxylated castor oils, alkyl phenol ethoxylates, ethoxylated alcohols, sorbitan esters, glycerine esters, polyethylene glycols and phospholipids.

In an alternative form of the invention the surfactant function of the composition may be provided by a pseudo-surfactant being a microfine particulate material to allow for the formation of a Pickering emulsion. Such a pseudo-surfactant may be selected from alumina, bentonite, magnesium aluminium silicate, fat crystals, magnesium oxide, magnesium trisilicate, titanium dioxide, fumed silica, silica and tin oxide and other surface treated compounds.

In an alternative form the invention is said to reside in an emulsion including a continuous phase, a discontinuous phase which is immiscible in the continuous phase, and a surfactant, the surfactant having a first part which is compatible with the continuous phase and a second part which is compatible with the discontinuous phase, characterised by the continuous phase having a high volume resistivity, the discontinuous phase being electrically charged and including a compound selected from the group comprising a bio-active agent, a catalyst, a reagent or reactant including acids and bases, a blocking chemical, a de-blocking chemical, an organic or inorganic derivatisation chemical, a pharmaceutical, a dye or a pigment and the surfactant being selected to not significantly reduce the volume resistivity of the continuous phase.

As discussed above the continuous phase is comprised of a liquid which is electrically insulative and although the characteristics of a particular system would have to be determined empirically it is expected that such a liquid would preferably have a volume resistivity of approximately $1 \times 10^6$ ohm-cm or greater.

The continuous phase may be selected from hydrocarbons such as hexane, cyclohexane, iso-octane, heptane, decalin, aromatic hydrocarbons and isodecane and commercially available mixtures of hydrocarbons such as the Isopars™ and Norpars™ made by Exxon. The continuous phase may also be selected from fluorochemicals including fluorocarbon compounds. These fluorochemicals generally comprise from 2 to 16 carbon atoms and include, but are not limited to, linear, cyclic or polycyclic perfluoroalkanes, bis(perfluoroalkyl)alkenes, perfluoroethers, perfluoroalkylamines, perfluoroalkyl bromides and perfluoroalkyl chlorides such as the Fluorinerts™ made by 3M. The continuous phase may also be selected from silicone fluids such as polyphenylmethyl siloxanes (PMMS), dimethyl polysiloxanes, polydimethyl siloxanes, cyclic dimethyl siloxanes and the like.

In one embodiment the continuous phase may be supercritical carbon dioxide ($cCO_2$). This liquid has the property of being compatible with fluorinated surfactants.

The continuous phase may also be a gel or highly viscous liquid.

The discontinuous phase may be aqueous or non-aqueous. Where the discontinuous phase is non-aqueous it should be immiscible or substantially insoluble in the continuous phase.

The discontinuous phase may be an active reagent such as a chemical de-protecting agent or it may be a solvent or a carrier for the active chemical reagent. Alternatively the active chemical reagent may be a solid or insoluble liquid dispersed in the discontinuous phase.

The non-aqueous discontinuous phase may be selected from acetone, acetonitrile, cyclohexanone, decalin, dibromomethane, dichloromethane (methylene chloride, DCM), trichloromethane, dimethyl formamide (DMF), dioxane, 1,2-dichloroethane (DCE), nitromethane, tetrahydrofuran, toluene, dimethyl formamide, isobutanol, isodecane and commercially available mixtures of compounds such as the Isopars™ and Norpars™ made by Exxon, propylene carbonate, dimethyl sulphoxide or mixtures of compounds such as isopropanol/methylene chloride, nitromethane/methanol, nitromethane/isopropanol, trichloromethane/methanol or isopropanol/methylene chloride.

The emulsions according to the invention may also include charge control agents.

The charge control agent may be selected so as to have analogues of the principal components of the continuous phase and the discontinuous phase. For instance where the continuous phase is a fluorochemical the charge control agent may include a fluorine analogue of the compounds listed below.

In some embodiments the function of the charge control agent may be provided by the surfactant or may be intrinsic to the emulsion droplets carrying a chemical substance, eg an acid for de-protection.

The charge control agent may be an acid and its salts, an organic acid and its salts or an ionic or zwitterionic compound.

The charge control agents may be selected from metallic soaps wherein the metal includes: barium, calcium, magnesium, strontium, zinc, cadmium, aluminium, gallium, lead, chromium, manganese, iron, nickel, zirconium and cobalt and the acid portion is provided by a carboxylic acid, e.g., caproic acid, octanoic (caprylic) acid, capric acid, lauric acid, myristic acid, palmitic acid, stearic acid, oleic acid, linolic acid, erucic acid, tallitic acid, resinic acid, naphthenic acid, succinic acid and the like. Examples of metallic soaps include: aluminium tristearate, aluminium distearate, barium, calcium, lead and zinc stearates; cobalt, manganese, lead and zinc linoleates; aluminium, calcium and cobalt octoates; calcium and cobalt oleates; zinc palmitate; calcium, cobalt, manganese, lead and zinc naphthenates; calcium, cobalt, manganese, lead and zinc resinates and the like. The charge control agent may also be a phospholipid such as lecithin or alkyl succinimide. The charge control agent may also be a basic calcium petronate or similar compound.

Additional components in the discontinuous phase may be bio-active agents, reagents and reactants such as acids and bases, blocking and de-blocking chemicals and derivatisation chemicals whether organic or inorganic, pharmaceuticals, dyes or pigments. Catalysts may also be included in the discontinuous phase, deposited for instance for subsequent electroless deposition of gold, copper, nickel and the like.

An emulsion according to this invention may have a continuous phase which is present in the range of about 20 to 99.99 percent by volume, a discontinuous phase which is present in a range of from about 0.01 to 80 percent by volume, optionally a surfactant which is present in a range of about 0.01 to 20 percent by weight and a charge control agent which is present in a range of 0.01 to 10 percent by weight.

For some application the emulsions may be manufactured immediately prior to use and in such situations the surfactant may not be necessary.

Throughout this specification the term emulsions is used to indicate emulsions, miniemulsions and microemulsions. Hence the emulsions according to this invention may be true emulsions, that is, emulsions which are formed by the input of mechanical energy such as by shaking, stirring or the like. Emulsions may be manufactured using a device such as a Sonicator, Ultra-Turrax or a Microfluidiser. Alternatively the emulsions may be mini-emulsions which form with the application of more energy than for a standard emulsion. Alternatively the emulsions may be micro-emulsions which form substantially spontaneously provided the correct conditions of temperature and chemical composition are present. Emulsions may have a droplet size from about 100 microns down to 0.2 microns, miniemulsions may have a droplet size from 500 nanometers down to about 50 nanometers and microemulsions may have droplet sizes of from about 200 nanometers down to 1 nanometer. It will be noted that there are no hard and fast rules on the size ranges for each. Size ranges will depend upon the composition of each of the phases and the surfactant if used and the method of preparation.

The term droplets is intended to refer to the various morphological forms of the discontinuous phase in an emulsion. It may include shapes other than spherical for instance cubic, cylindrical and lamellar.

An emulsion according to the present invention may also include emulsion of the type known as a Pickering emulsions. These emulsions are systems of a continuous phase, a finely dispersed discontinuous phase and at least one type of microfine particles which have an average particle size of less than 200 nm and which display amphiphilic character. The microfine particles may be selected from alumina, bentonite, magnesium aluminium silicate, fat crystals, magnesium oxide, magnesium trisilicate, titanium dioxide, treated fumed silica, silica and tin oxide. The stability of Pickering emulsions depends upon such factors as wetting contact angle, particle size, particle concentration, interparticulate interaction and viscosity of the continuous phase.

A key factor for the use of particles as a stabilization agent is the wetting of the particles by the two phases. The affinity to each of the two phases should be different. This is expressed by the contact angle. A nonaqueous emulsions, in particular, a perfluoro continuous phase and an organic discontinuous phase would require the wetting of the particles that stabilize the emulsion by both the perfluoro phase and the nonaqueous phase or oil phase. The solid particles are usually 10-fold smaller in size than the discontinuous phase droplets of the emulsion. Capillary forces can support the formation of a particulate network in the interface. This serves as a mechanical barrier that prevents the coalescence of the discontinuous phase droplets. The protection against coalescence is based on the energy to expel the particles from the interface into the continuous phase. This energy depends on the contact angle which ideally should be close to 90°. One suggested method for determination of the contact angle of the small particles is by determination of the sinking time of a given weight of particles and a given fluid. If the particles are completely wet no emulsion is formed. Dilute Pickering emulsions of low viscosity will sediment i.e. will move to the bottom of the vessel but do not coalesce i.e. the small discontinuous phase emulsion droplets do not join together to form a larger droplet.

The preferred method to make a Pickering emulsion is to disperse the particles (usually submicron) used to stabilize the emulsion in the continuous phase. It is most important that the particles are sufficiently deagglomerated to achieve optimum results. Deagglomeration requires very high shear to break up the agglomerates and disperse the particles, such equipment as Microfluidizer, high intensity ultrasonic probes, colloid mills, three roll mills etc. The discontinuous phase is emulsified in the continuous phase containing the predisposed particles by use of such emulsification equipment as an Ultra Turrax.

For this invention the particles or droplets of emulsion may range in size from 100 microns downwards depending upon the type of emulsion and the applications to which the emulsion is to be applied. Preferably in the case of emulsions for chemical de-protecting in the phosphoramidite process the emulsions may have a size range from 50 microns down to 20 nanometers.

It will be seen that by the use of emulsions of the present invention commercial fabrication at micrometer and nanometer scale by spatially selective deposition of chemical substances will be possible because of the sizes of the droplets in the emulsions and their ability to carry deposition materials or reagents to selected sites.

Although the mechanism of charging of the emulsion droplets is not fully understood applicants believe that it relates to accumulation of polar or ionic species at the interface between the continuous and discontinuous phases. Electrostatic charging of the emulsions has been noted both with and without the use of charge control agents and surfactants.

The electrical charge on the droplets of the discontinuous phase of the emulsions according to the present invention may be positive or negative. Applicant has produced both depending upon the compositions selected.

Some surfactants may be non-polar in nature but still contribute to electrostatic charging of the droplets of the emulsion. This may be due to the presence of impurities in the surfactant, for instance, catalysts, residual reactants, by-products and compounds used in the manufacture of the surfactants.

Where the emulsion of the present invention is to be applied for the chemical de-protecting step of the formation of a DNA array, the invention may be said to reside in a composition being an emulsion including a continuous phase comprising an insulative liquid and a discontinuous phase comprising a non-aqueous or aqueous solvent and a chemical de-protecting reagent in solution in the non-aqueous or aqueous solvent, and wherein the continuous phase has a high volume resistivity and the discontinuous phase is electrically charged.

In an alternative embodiment where the emulsion of the present invention is to be applied for the chemical de-protecting step of the formation of a DNA array, the invention may be said to reside in a composition being an emulsion including a continuous phase comprising an insulative liquid, a discontinuous phase comprising a non-aqueous or aqueous solvent and a chemical de-protecting reagent in solution in the non-aqueous or aqueous solvent and a surfactant, the surfactant having a first part which is compatible with the continuous phase and a second part which includes a group which is compatible with the discontinuous phase, and wherein the continuous phase has a high volume resistivity and the discontinuous phase is electrically charged and the surfactant being selected to not significantly reduce the volume resistivity of the continuous phase.

The continuous phase may be a silicone fluid or an organic liquid, such as a hydrocarbon oil selected from hexane, cyclohexane, iso-octane, heptane, naphthalenes, aromatic hydrocarbons, decalin and isodecane and commercially available mixtures of hydrocarbons such as the Isopars™ and Norpars™ made by Exxon.

Alternatively, the continuous phase may be a fluorochemical such as perfluorooctane, linear, cyclic or polycyclic perfluoroalkylalkanes, bis(perfluoroalkyl)alkenes, perfluoroethers, perfluoroamines, perfluoroalkyl bromides and perfluoroalkyl chlorides such as the Fluorinerts™ made by 3M.

Preferably where the continuous phase is a fluorochemical the surfactant may be a fluorochemical having a fluorophilic part and a part which is compatible with the discontinuous phase such as lipophilic part. These compounds may also be referred to as amphiphiles. Examples of these are perfluorocarbon-propoxypropylene, fluoroalkyl citrate, perfluoroalkyl-alkylene mono- or di-morpholinophosphate and fluorinated phospholipids, alcohols, polyols or polyhydroxylated or aminated derivatives including amine oxides, amino acid derivatives and fluorinated analogues of AOT (1,4bis(2-ethylhexyl)sulphosuccinate).

The fluorinated surfactants may also be associated with hydrophobic, non-ionic, anionic, cationic or zwitterionic moieties. Such moieties include, for example, phospholipids, copolymers of the polyoxyethylene polyoxyethylenepolyoxypropylene type and polyoxyethylene sorbitan esters.

Alternatively the fluorochemical of this embodiment may be replaced by an alternative compound such as a silicone fluid and hence the surfactant would be selected from a compound which had a silicophilic part.

There may also be used combinations of the various surfactants discussed above.

The emulsion according to this form of the invention may further include a charge control agent of the type discussed above.

As discussed above it may be noted that the emulsions according to this embodiment of the invention may be true emulsions or miniemulsions, that is, emulsions which are formed by the input of mechanical energy such as by shaking, stirring, high shear, or the like. Alternatively the emulsions may be microemulsions which form substantially spontaneously provided the correct conditions of temperature and chemical composition are present.

Stability of charged emulsions may be a problem for commercialisation and to overcome is problem it is proposed that the emulsions could be made in situ, the various ingredients combined and emulsified just before use.

A preferred alternative is to provide the emulsions in concentrated form and diluted just prior to use. This is a proven methodology used in the agricultural industries for supplying emulsified pesticides etc that are diluted by addition of substantial amounts of the continuous phase just before use to the required usable concentration. Concentrated emulsions have much higher viscosity and long term stability (it is reported in the Atlox 4912 Technical Bulletin 00-2 that it is possible to produce concentrated discontinuous phase of 73%-80%).

The emulsion of the present invention may be used for a range of solid phase chemical reactions where it is desired to react on a substrate in a spatially selective manner.

In one embodiment the emulsion may be used in a method of forming a solid phase chemical array on a substrate using a stepwise reaction process, the method including the steps of:
(a) defining at least one region on the substrate by forming an electric field on that region which is different from the electric field on other regions of the substrate,
(b) applying an emulsion to the substrate, the emulsion having the electrically charged discontinuous phase droplets and a chemical de-protecting reagent carried in the discontinuous phase,
(c) depositing the discontinuous phase of the emulsion to the at least one region by attraction by the electric field on the region and optionally by the use of a bias voltage to reduce deposition in non-required regions,
(d) causing a chemical reaction in the at least one region,
(e) removing the emulsion, and
(f) carrying out subsequent steps of the stepwise reaction process.

In an alternative embodiment the emulsion may be used in a method of forming a DNA array on a substrate using a stepwise coupling process with a chemical de-protecting step prior to each coupling step, the method including the steps of:
(a) defining at least one region on the substrate by forming an electric or electrostatic charge on that region which is different from the an electric or electrostatic charge on other regions of the substrate such as by formation of an electrostatic image thereon,
(b) applying an emulsion to the substrate, the emulsion having the electrically charged discontinuous phase and a chemical de-protecting reagent carried in the discontinuous phase as discussed above,
(c) depositing the discontinuous phase of the emulsion to the at least one region by attraction by the electric field on the region and optionally by the use of a bias voltage to reduce deposition in non-required regions,
(d) causing chemical de-protecting in the at least one region,
(e) removing the emulsion, and
(f) carrying out subsequent steps of the stepwise coupling process.

The subsequent steps of the stepwise coupling process may be such as those that are carried out in the standard phosphoramidite chemistry for synthesis of oligodeoxynucleotides although as discussed earlier the invention is not limited to this particular chemistry.

It will be realised that the process as discussed above may be repeated a sufficient number of times to synthesise selected oligonucleotides of any sequence in a predetermined spatial order, position and length on the substrate.

The substrate may be any insulative or dielectric material which is able to hold an electric charge for sufficient time for attracting the discontinuous phase of the emulsion to the at least one preselected region. The substrate may include dielectrics such as glass, plastics materials or the like and alternatively may include photo conductors such as zinc oxide, cadmium sulphide, amorphous selenium, alloys of selenium such as selenium-tellurium, lead selenide, selenium-arsenic, and the like. Additionally, there can be selected as photoresponsive imaging members various organic photoconductive materials including, for example, polyvinylcarbazole (PVK) or complexes of polyvinylcarbazole sensitised with trinitrofluorenone. There are also disclosed layered organic photoresponsive devices with aryl amine hole transporting molecules, and photogenerating layers, reference U.S. Pat. No. 4,265,990, the disclosure of which is totally incorporated herein by reference.

The step of defining at least one region on the substrate by forming an electric or electrostatic charge on that region may include the step of charge reversal to thereby provide an enhanced electric field in the selected region.

The formation of the an electric or electrostatic charge may be by electrostatic means such as wherein the substrate is a photoconductor and the formation of the electrostatic field is by electrostatic or other charging and then selective discharge by illumination. Preferably the illumination may not include radiation in the short ultraviolet region when used in relation to DNA manufacture as this may cause damage to the DNA molecule. For the assembly of other chemical chips or arrays, however, UV radiation may be used.

In one preferred embodiment, the stepwise synthesis process is the phosphoramidite process which uses chemical de-protecting, namely removal of a trityl group but the invention is not so limited but may include other stepwise coupling or addition processes.

The step of removing the emulsion may include the step of neutralising any residual chemical de-protecting agent in the emulsion to prevent it from reacting in non-desired parts of the array and washing.

As discussed above, the emulsion for use for the present invention comprises an electrically insulative continuous phase such as a fluorochemical, an aqueous or a non-aqueous discontinuous phase for instance a hydrocarbon oil which carries the chemical de-protecting agent in it in solution, with preferably a surfactant and preferably a charge control agent.

Where the discontinuous phase is a hydrocarbon oil, the chemical de-protecting agent may be a strong protic organic or inorganic acid.

The non-aqueous discontinuous phase which carries the chemical de-protecting agent may be selected from acetone, acetonitrile, cyclohexanone, decalin, dibromomethane, dichloromethane (methylene chloride, DCM), trichloromethane, dimethyl formamide (DMF), dioxane, 1,2-dichloroethane (DCE), nitromethane, tetrahydrofuran, toluene, dimethyl formamide, isobutanol, isodecane and commercially available mixtures of hydrocarbons such as the Isopars™ and Norpars™ made by Exxon, propylene carbonate, dimethyl sulphoxide or mixtures of compounds such as isopropanol/methylene chloride, nitromethane/methanol, nitromethane/isopropanol, trichloromethane/methanol or isopropanol/methylene chloride.

The chemical de-protecting agent may be a Lewis acid or a protic acid. The Lewis acid may be selected from but not restricted to zinc bromide, titanium tetrachloride, and ceric ammonium nitrate while dilute protic acids which can be used include, but are not limited to, dilute mineral acids, trichloroacetic acid (TCA), dichloroacetic acid (DCA), benzenesulphonic acid, trifluoroacetic acid (TFA), difluoroacetic acid, perchloric acid, orthophosphoric acid and toluenesulphonic acid. Other acids may include dodecylbenzene sulphonic acid, dinonylnaphthyldisulphonic acid (DNNDSA), dinonylnaphthylsulphonic acid (DNNSA), perfluorooctanoic acid (PFOA) and diphenyl acid phosphate.

EXAMPLES

This then generally describes the invention but to assist with understanding, reference will now be made to examples of emulsions according to the present invention and discussion in more detail of the stages of formation of a DNA array.

Numerous combinations have been tested to represent a range of continuous phases and discontinuous phases, their incompatibility and their ability to carry relevant materials for site-specific deposition and/or reaction.

Water in Isopar G Examples

A experiment was carried out to determine whether a charged emulsion would deposit on an oppositely charged substrate with an electrostatic pattern formed thereon. For this purpose an emulsion was formed with an insulative continuous phase and a discontinuous phase which included a dye and a substrate comprising a zinc oxide photoconductor was charged with a negative pattern:

The emulsion comprised the following;

| Continuous phase | Isopar G | 9.9 ml |
|---|---|---|
| Discontinuous phase | Water | 0.95 ml |
| | Disulphine blue (20 mg/ml aqueous) | 0.05 ml |
| | Atlox 4912 (10% w/v in Isopar G) | 0.1 ml |

Isopar G is a hydrocarbon manufactured by Exxon
Disulphine Blue AN 200 was manufactured by ICI
Atlox 4912 is a Atlox 4912 is a nonionic A-B-A block copolymer 12-hydroxystearic acid polyethylene glycol copolymer manufactured by the Uniqema business of ICI.
Zinc oxide photoconductor was supplied by Applied Research of Australia Pty Ltd and comprised zinc oxide bound with an insulative resin coated onto a PET aluminium metalised film.

It was found that the discontinuous phase incorporating the blue dye deposited only in the area of the negative charge pattern indicating positively charged droplets in the emulsion.

In a further experiment comparable results were obtained when the emulsion composition comprised a continuous phase of Isopar G and:
a 0.5% to 5% (v/v) aqueous discontinuous phase with disulphine blue and a surfactant concentration of 0.5% (w/v) Atlox 4912 with respect to the discontinuous phase
a 0.5% to 2.5% (v/v) aqueous discontinuous phase with disulphine blue and a surfactant concentration of 0.5% to 2.5% (w/v) Atlox 4912 with respect to the discontinuous phase
a 0.5% to 1% (v/v) aqueous discontinuous phase with disulphine blue and a surfactant concentration of 5% (w/v) Atlox 4912 with respect to the discontinuous phase
a 0.5% (v/v) aqueous discontinuous phase with disulphine blue and a surfactant concentration of 10% (w/v) Atlox 4912 with respect to the discontinuous phase.

In a further experiment comparable results were obtained when the emulsion composition comprised a continuous phase of Isopar G and:
a 0.5% to 5% (v/v) aqueous discontinuous phase with disulphine blue and a surfactant concentration of 0.5% to 5% (w/v) Triton X-100 with respect to the discontinuous phase. Triton X-100 was supplied by Rohm and Haas.

In a further experiment comparable results were obtained when the emulsion composition comprised a continuous phase of Isopar G and:
a 0.5% to 5% (v/v) aqueous discontinuous phase with disulphine blue and a surfactant concentration of 0.5% to 5% (w/v) cetyltrimethylammonium bromide (CTAB) with respect to the discontinuous phase.

CTAB was purchased from Sigma Aldrich Chemical Company.

In a further experiment comparable results were obtained when the emulsion composition comprised a continuous phase of Isopar G and:
a 0.5% to 5% (v/v) aqueous discontinuous phase with disulphine blue and a surfactant concentration of 0.5% to 5% (w/v) sodium dodecylsulphate (SDS) with respect to the discontinuous phase.

SDS was purchased from APS Ajax Pine Chemicals, Australia.

In a further experiment comparable results were obtained when the emulsion composition comprised a continuous phase of Isopar G and:
a 0.5% to 1% (v/v) aqueous discontinuous phase with disulphine blue and a surfactant concentration of 0.5% to 5% (w/v) 1,4bis (2-ethylhexyl)sulphosuccinate with respect to the discontinuous phase.

1,4bis(2-ethylhexyl)sulphosuccinate (AOT) was purchased from Sigma Aldrich Chemical Company.

In a further experiment comparable results were obtained when the emulsion composition comprised a continuous phase of Isopar G and:
a 0.5% to 5% (v/v) aqueous discontinuous phase with disulphine blue and a surfactant concentration of 0.5% to 10% (w/v) Q2-5200 with respect to the discontinuous phase.

Q2-5200 (DC-5200) is a comb polymer surfactant comprising a backbone of silicone and substituents of lauryl and polyethylene/polypropylene oxide groups. It is a manufactured by Dow Corning.

Water in Silicone Fluid

In a further experiment comparable results were obtained when the emulsion composition comprised a continuous phase of Silicone Fluid 10 centipoise and:
- a 0.5% to 5% (v/v) aqueous discontinuous phase with disulphine blue and a surfactant concentration of 0.5% (w/v) 1,4bis(2-ethylhexyl)sulphosuccinate with respect to the discontinuous phase.

Silicone fluid 10 centipoise is manufactured by Dow Corning.

Water in Fluorocarbons

A further experiment was carried out to determine whether a charged emulsion would deposit on an oppositely charged substrate with an electrostatic pattern formed thereon. For this purpose an emulsion was formed with an insulative continuous phase and a discontinuous phase which included an acid and a substrate comprising a zinc oxide photoconductor was charged with a negative pattern. The photoconductor was dip-coated with a solution of Butvar 72 (1% w/v) and the pH indicator methyl orange (at saturation) in cyclohexanone and dried at 55° C. for 30 minutes:

The emulsion comprised the following;

| Continuous phase | FC40 | 0.95 ml |
|---|---|---|
| Discontinuous phase | Water | 0.035 ml |
| | Dichloroacetic acid | 0.01 ml |
| | FC134 (10% w/v in water) | 0.005 ml |

FC-40 is perfluorotributylamine with minor levels of fluorinated homologues, manufactured by 3M.

Dichloroacetic acid was supplied by Aldrich Chemical Co, Inc.

FC-134 is a cationic surfactant of the type fluoroalkyl quaternary ammonium iodide where the alkyl chain is predominantly 8 carbons, manufactured by 3M.

Methyl orange is a pH indicator dye manufactured by Kochlight.

Butvar 72 is polyvinyl butyral manufactured by Solutia.

It was found that the discontinuous phase incorporating the acid deposited only in the area of the charge pattern, giving a pH-dependent colour change from yellow to pink.

In a further experiment comparable results were obtained when the emulsion composition comprised a continuous phase of FC77.

The emulsion comprised the following;

| Continuous phase | FC77 | 0.95 ml |
|---|---|---|
| Discontinuous phase | Water | 0.035 ml |
| | Dichloroacetic acid | 0.01 ml |
| | FS300 | 0.005 ml |

FC-77 is perfluorooctane manufactured by 3M.

Zonyl™ PS300 is a 40% by weight aqueous solution of a non-ionic fluorosurfactant, manufactured by DuPont.

Water in Toluene

A further experiment was carried out to determine whether a charged emulsion would deposit on an oppositely charged substrate with an electrostatic pattern formed thereon. For this purpose an emulsion was formed with an insulative continuous phase and a discontinuous phase which included a dye and a substrate comprising a zinc oxide photoconductor which was charged with a negative pattern:

The emulsion comprised the following:

| Continuous phase | Toluene | 0.995 ml |
|---|---|---|
| Discontinuous phase | Water | 0.0025 ml |
| | Disulphine blue (20 mg/ml aqueous) | 0.0025 ml |
| | Q2-5200 (10% w/v in toluene) | 0.005 ml |

Toluene AR is a hydrocarbon supplied by BDH Chemicals Australia Pty Ltd.

It was found that the discontinuous phase incorporating the blue dye deposited only in the area of the charge pattern.

In a further experiment comparable results were obtained when the emulsion composition comprised a discontinuous phase incorporating Triton X-100 as surfactant.

The emulsion comprised the following;

| Continuous phase | Toluene | 0.995 ml |
|---|---|---|
| Discontinuous phase | Disulphine blue (20 mg/ml aqueous) | 0.0025 ml |
| | Triton X-100 (10% w/v in water) | 0.0025 ml |

Silicone Fluid in Fluorocarbon

A further experiment was carried out to determine whether a charged emulsion would deposit on an oppositely charged substrate with an electrostatic pattern formed thereon. For this purpose an emulsion was formed with an insulative continuous phase and a discontinuous phase not including a dye and a substrate comprising a zinc oxide photoconductor was charged with a negative pattern:

The emulsion comprised the following:

| Continuous phase | FC40 | 0.95 ml |
|---|---|---|
| Discontinuous phase | Silicone fluid 50CS | 0.05 ml |

Silicone fluid 50 centipoise is manufactured by Dow Corning.

It was found that the discontinuous phase deposited only in the area of the charge pattern, visible by a "wetting" effect on the photoconductor indicating positively charged droplets in the emulsion.

In a further experiment comparable results were obtained when the emulsion composition comprised a discontinuous phase incorporating Zonyl® TBC as surfactant.

The emulsion comprised the following:

| Continuous phase | FC40 | 0.95 ml |
|---|---|---|
| Discontinuous phase | Silicone fluid 50CS saturated with TBC | 0.05 ml |

Zonyl™ TBC is a citric ester of fluoroalkylalcohols of the general formula $F(CF_2.CF_2)_nCH_2.CH_2OH$, with a homologue distribution (n) dominated by hexyl and octyl units, manufactured by DuPont, USA.

It was found that the discontinuous phase deposited only in the area of the charge pattern, visible by a "wetting" effect on the photoconductor remaining after the continuous phase solvent had evaporated.

In a further experiment comparable results were obtained when the emulsion composition comprised a continuous phase of FC77.

The emulsion comprised the following:

| Continuous phase | FC77 | 0.95 ml |
| --- | --- | --- |
| Discontinuous phase | Silicone fluid 50CS | 0.05 ml |

It was found that the discontinuous phase deposited only in the area of the charge pattern, visible by a "wetting" effect on the photoconductor.

In a further experiment comparable results were obtained when the emulsion composition comprised a continuous phase of FC77 and a discontinuous phase incorporating Zonyl® TBC as surfactant.

The emulsion comprised the following:

| Continuous phase | FC77 | 0.95 ml |
| --- | --- | --- |
| Discontinuous phase | Silicon fluid 50CS saturated with TBC | 0.05 ml |

It was found that the discontinuous phase deposited only in the area of the charge pattern, visible by a "wetting" effect on the photoconductor.

Toluene in Fluorocarbon Solvent

A further experiment was carried out to determine whether a charged emulsion would deposit on an oppositely charged substrate with an electrostatic pattern formed thereon. For this purpose an emulsion was formed with an insulative continuous phase and a discontinuous phase which included an acid and a substrate comprising a zinc oxide photoconductor was charged with a negative pattern. The photoconductor was dip-coated with a solution of Butvar 72 (1% w/v) and the pH indicator methyl orange (at saturation) in cyclohexanone, and dried at 55 degrees C. for 30 minutes:

The emulsion comprised the following:

| Continuous phase | FC40 | 0.89 ml |
| --- | --- | --- |
| Discontinuous phase | 5% dichloroacetic acid (w/v) in toluene | 0.1 ml |
| | F6H14 (1% in FC40, v/v) | 0.01 ml |

F6H14 is a semifluorinated alkylalkane, 1-(perfluoro-n-hexyl) tetradecane, manufactured by Apollo Scientific Ltd, UK.

It was found that the discontinuous phase deposited only in the area of the charge pattern, giving a pH-dependent colour change from yellow to pink.

In a further experiment comparable results were obtained when the emulsion composition comprised a continuous phase of FC40 and a discontinuous phase incorporating higher levels of F6H14 as surfactant.

The emulsion comprised the following:

| Continuous phase | FC40 | 0.8 ml |
| --- | --- | --- |
| Discontinuous phase | 5% (w/v) dichloroacetic acid in toluene | 0.1 ml |
| | F6H14 (1% in FC40, v/v) | 0.1 ml |

It was found that the discontinuous phase deposited only in the area of the charge pattern, giving a pH1-dependent colour change from yellow to pink.

A further experiment was carried out to determine whether a charged emulsion would deposit on an oppositely charged substrate with an electrostatic pattern formed thereon. For this purpose an emulsion was formed with an insulative continuous phase and a discontinuous phase which included a dye and a substrate comprising a zinc oxide photoconductor was charged with a negative pattern:

The emulsion comprised the following;

| Continuous phase | FC40 | 0.9 ml |
| --- | --- | --- |
| Discontinuous phase | 0.2% ethyl red in toluene (w/v) | 0.05 ml |
| | 5% Zonyl® FTS in toluene (w/v) | 0.05 ml |

Ethyl Red is 2-[p-diethylaminophenylazo]-benzoic acid, supplied by Sigma Chemical Co.

Zonyl® FTS is a fluorotelomer intermediate manufactured by DuPont Chemicals.

It was found that the discontinuous phase incorporating the red dye deposited only in the area of the charge pattern.

In a further experiment comparable results were obtained when the emulsion composition comprised a continuous phase of FC40 and a discontinuous phase incorporating Zonyl® TBC as surfactant.

The emulsion comprised the following.

| Continuous phase | FC40 | 0.975 ml |
| --- | --- | --- |
| Discontinuous phase | 5% dichloroacetic acid (v/v) and 0.2% ethyl red in toluene | 0.02 ml |
| | 10% TBC in HFE 7200 (w/v) | 0.005 ml |

HFE 7200 is a fluoro-solvent, 1-ethoxyperfluorobutane, manufactured by 3M.

It was found that the discontinuous phase deposited only in the area of the charge pattern, giving a colour change from white to pink for plain zinc oxide photoconductor, and from yellow to red for methyl orange-doped zinc oxide photoconductor.

Ethylene Glycol in Fluorocarbon

A further experiment was carried out to determine whether a charged emulsion would deposit on an oppositely charged substrate with an electrostatic pattern formed thereon. For this purpose an emulsion was formed with an insulative continuous phase and a discontinuous phase which included a fluorescent dye and a substrate comprising a glass microscope coverslip dip-coated with 1% Butvar 72 in cyclohexanone (dried at 55 degrees C. for 30 minutes) was charged with a negative pattern.

The emulsion comprised the following:

| Continuous phase | FC40 | 0.989 ml |
| --- | --- | --- |
| Discontinuous phase | 5% (w/v) dichloroacetic acid and 0.002% Rhodamine B both in ethylene glycol (w/v) | 0.001 ml |
| | F6H14 | 0.01 ml |

Rhodamine B was supplied by Sigma Chemical Co.

It was found by observing the coverslip under fluorescence microscopy that the discontinuous phase deposited only in the area of the charge pattern, giving a brilliant pink colouration.

In a further experiment comparable results were obtained when the emulsion composition comprised a continuous phase of FC40 and a discontinuous phase incorporating F6H14 as surfactant at higher levels.

The emulsion comprised the following:

| | | |
|---|---|---|
| Continuous phase | FC40 | 0.949 ml |
| Discontinuous phase | 5% (v/v) dichloroacetic acid and 0.002% Rhodamine B both in ethylene glycol (w/v) | 0.001 ml |
| | F6H14 | 0.05 ml |

In a further experiment comparable results were obtained when the emulsion composition comprised a continuous phase of FC40 and a discontinuous phase incorporating F6H14 as surfactant at even higher levels.

The emulsion comprised the following:

| | | |
|---|---|---|
| Continuous phase | FC40 | 0.749 ml |
| Discontinuous phase | 5% (v/v) dichloroacetic acid and 0.002% Rhodamine B both in ethylene glycol (w/v) | 0.001 ml |
| | F6H14 | 0.25 ml |

Nitrobenzene in Fluorocarbon

A further experiment was carried out to determine whether a charged emulsion would deposit on an oppositely charged substrate with an electrostatic pattern formed thereon. For this purpose an emulsion was formed with an insulative continuous phase and a discontinuous phase which included a fluorescent dye and a substrate comprising a glass microscope coverslip dip-coated with 1% Butvar 72 in cyclohexanone (dried at 55 degrees C. for 30 minutes) was charged with a negative pattern.

The emulsion comprised the following:

| | | |
|---|---|---|
| Continuous phase | FC40 | 0.989 ml |
| Discontinuous phase | 5% dichloroacetic acid (v/v), 5% VTACL (w/v), Rhodamine 6G at saturation all in nitrobenzene | 0.01 ml |
| | F6H14 | 0.001 ml |

Rhodamine 6G was supplied by George T. Gurr (a division of Baird & Tatlock, Essex, UK).

VTACL is a low molecular weight fraction of vinyl toluene acrylate (Pliolite) manufactured by Goodyear.

It was found by observing the coverslip under fluorescence microscopy that the discontinuous phase deposited only in the area of the charge pattern, giving a brilliant pink colouration.

Dimethylsulphoxide (DMSO) in Fluorocarbon

A further experiment was carried out to determine whether a charged emulsion would deposit on an oppositely charged substrate with an electrostatic pattern formed thereon. For this purpose an emulsion was formed with an insulative continuous phase and a discontinuous phase which included a fluorescent dye and a substrate comprising a glass microscope coverslip dip-coated with 1% Butvar 72 in cyclohexanone (dried at 55 degrees C. for 30 minutes) was charged with a negative pattern.

The emulsion comprised the following:

| | | |
|---|---|---|
| Continuous phase | FC40 | 0.998 ml |
| Discontinuous phase | 5% (w/v) oxalic acid, 0.002% (w/v) Rhodamine B both in DMSO | 0.001 ml |
| | 3% FC134 in DMSO | 0.001 ml |

Oxalic acid was supplied by BDH Laboratory Supplies, UK

DMSO was supplied by Ajax Fine Chemicals, Australia

It was found by observing the coverslip under fluorescence microscopy that the discontinuous phase deposited only in the area of the charge pattern, giving a brilliant pink colouration.

A further experiment was carried out to determine whether a charged emulsion would deposit on an oppositely charged substrate with an electrostatic pattern formed thereon. For this purpose an emulsion was formed with an insulative continuous phase and a discontinuous phase which included a dye and polymer dissolved in the discontinuous phase so as to protect the dye from both water and air during and after deposition. A substrate comprising a zinc oxide photoconductor was charged in its entirety then covered with a mask before exposure to light so as to form a negative charge pattern that was a replica image of the mask.

The emulsion comprised the following:

| | | |
|---|---|---|
| Continuous phase | FC40 | 0.99 ml |
| Discontinuous phase | 1% Butvar 72 (w/v), 0.1% (w/v) crystal violet in DMSO | 0.005 ml |
| | 1% (w/v) Atlox 4912 in DMSO | 0.005 ml |

Crystal violet was supplied by George T. Gurr, Searle Scientific Services, Bucks, UK It was found that the discontinuous phase deposited only in the area of the charge pattern not exposed to light, giving a violet colouration. Surface regions as small as 50 microns across, the smallest feature attempted were dearly defined by dye deposition.

In a further experiment comparable results were obtained when the emulsion composition comprised a continuous phase of FC40 and a discontinuous phase incorporating a polymer, AOT as surfactant and the pink fluorescent dye Rhodamine B.

The emulsion comprised the following:

| | | |
|---|---|---|
| Continuous phase | FC40 | 0.99 ml |
| Discontinuous phase | 1% Butvar 72 (w/v), 0.1% (w/v) Rhodamine B both in DMSO | 0.005 ml |
| | 10% (w/v) AOT in DMSO | 0.005 ml |

It was found that the discontinuous phase deposited only in the area of the charge pattern not exposed to light, giving a fluorescent pink colouration.

Examples of Negatively Charged Emulsions

For some processes it may be advantageous to use negatively charged emulsions.

Example 1

Zonyl FS-62 is a blend of perfluoroalkylsulphonic acids and perfluoroalkylsulphonates in acidified water having the composition as follows:

| Component | % incorporated |
|---|---|
| Perfluorohexylethylsulphonic acid | 12-18% |
| Ammonium perfluorohexylethylsulphonate | 6-9% |
| Perfluorooctylethylsulphonic acid | 1-3% |

-continued

| Component | % incorporated |
|---|---|
| Ammonium perfluorohexylethylsulphonate | 1-3% |
| Acetic acid | 1-3% |
| Water | 60-85% |

An emulsion was prepared incorporating FS-62 as a 1% (v/v) discontinuous phase in Isopar G, and deposited onto a strip of zinc oxide photoconductor bearing a negative charge pattern as a latent image. Droplet deposition was in those areas that had had their negative charge discharged and there was droplet avoidance of zones bearing a negative charge confirming the negative charge on the emulsion droplets.

The pattern of droplet deposition was imaged using zinc oxide photoconductor strips doped with a 0.02% (w/v) ethanolic solution of ethyl red pH indicator and dried at 55 degrees C. for 15 minutes, a change from pale pink to vivid red revealing the location of the acidic discontinuous phase.

Zonyl® FS-62 is manufactured by DuPont, USA

Ethyl Red is 2-[p-diethylaminophenylazo]-benzoic acid, supplied by Sigma Chemical Co.

Example 2

An emulsion was prepared incorporating a saturated solution of perfluorooctanoic acid (PFOA) in FC-77 as a 5% (v/v) discontinuous phase in decalin. [A PFOA concentration of slightly less than 1% in FC-77 is achieved at 25 degrees C.]. The emulsion was deposited onto a strip of zinc oxide photoconductor bearing a negative charge pattern as a latent image. Droplet deposition was in those areas that had had their negative charge discharged, droplet avoidance of zones bearing residual negative charge confirming the negative charge on the emulsion droplets.

The pattern of droplet deposition was imaged using zinc oxide photoconductor strips doped with a 0.02% (w/v) ethanolic solution of ethyl red pH indicator and dried at 55 degrees C. for 15 minutes, a change from pale pink to vivid red revealing the location of the acidic discontinuous phase.

Perfluorooctanoic acid was supplied by Aldrich Chemical Co. Inc.

Example 3

An emulsion was prepared incorporating a 55% (w/v) solution of dinonylnaphthyldisulphonic acid (DNNDSA) in isobutanol as a 1% (v/v) discontinuous phase in Isopar G. The emulsion was deposited onto a strip of zinc oxide photoconductor bearing a negative charge pattern as a latent image. Droplet deposition was in those areas that had had their negative charge discharged, droplet avoidance of zones bearing residual negative charge confirming the negative charge on the emulsion droplets.

The pattern of droplet deposition was imaged using zinc oxide photoconductor strips doped with a 0.02% (w/v) ethanolic solution of ethyl red pH indicator and dried at 55 degrees C. for 15 minutes, a change from pale pink to vivid red revealing the location of the acidic discontinuous phase.

DNNDSA was supplied by Sigma Aldrich Inc.

For Example 1, the discontinuous phase is FS-62 containing 60-85% water (manufacturer's specifications) and might be expected to adopt a positive charge in any non-aqueous continuous phase. Against expectation, further additions of water to FS-62 as discontinuous phase appeared to make it more negative, rather than cause it to switch to "positive".

Example 2 performed as expected, a powerfully surface-active fluoro acid in a fluoro solvent gives a negative charge.

In Example 3, the DNNDSA functions both as an acid and a surface-active agent, overcoming what might have expected to be a positive charge for isobutanol in Isopar G.

Examples of Concentrated Charged Emulsions

Two W/O (Water in Oil) formulations were made up as follows:

| | |
|---|---|
| Continuous Phase | 10 ml Isopar G (50%)<br>Add 0.2 g Atlox 4912 to Isopar G and heat to 55 degrees C. |
| Discontinuous Phase | Add 10 ml Milli Q Water 50% containing 20 milligram Disulphine blue dye per mil and heat to 55 degrees. Shake well and sonicate with a ¼" probe in Sonics and Materials Sonicator. |
| Continuous Phase | 6 ml Isopar G (30%)<br>Add 0.28 g Atlox 4912 to Isopar G and heat to 55 degrees C. |
| Discontinuous Phase | Add 14 ml Milli Q Water containing 20 milligram Disulphine blue dye per ml and heat to 55 degrees C. Shake well and sonicate with a ¼" probe in Sonics and Materials Sonicator. |

Both emulsions showed signs of thickening after sonication. On standing for 2 days there was a very small amount of separation into a blue top and darker blue bottom layers both would redisperse on shaking indicating that there was no coalescence of the discontinuous water phase. Both of the concentrated emulsions when diluted with Isopar G deposited on an electrostatic charge pattern.

Both concentrated emulsions, 303 and 304, reached an equilibrium separation on standing. On shaking and dilution of a small quantity of the concentrate, similar deposition of the blue discontinuous phase on a charge pattern similar to those originally obtained were obtained some 150 days later.

| Formulation of a Pickering Emulsion | |
|---|---|
| Continuous Phase | Place 30 ml Isopar G in a 50 ml polypropylene vial. Add 0.68 g Degussa R805 hydrophobic Aerosil to Isopar G and predisperse with Ultra Turrax.<br>Sonicate with a ¼ inch probe (Sonics and Materials Sonicator) multiple times for 1 minute.<br>Dispersion of the Aerosil R805 in the Isopar G with the ultrasonic probe was repeated 5 times for 2 minutes each, cooling the dispersion down between sonication steps. This produced a clear solution with a slight haze. This dispersion was used as a master batch.<br>The master batch of dispersed 2.3% by weight Aerosil R805 was divided up into a number of identical polypropylene vials and reduced to ½% weight/volume by the further addition of Isopar G. The addition of the Isopar G was again undertaken by cooling down the master batch and adding the Isopar G by sonication for 2 minutes × 4 with cooling prior to each sonication. |
| Discontinuous Phase | Take 15 ml of the above ½% by weight Aerosil dispersion and add 0.15 ml of 2% weight by volume disulphine blue dye dissolved in milliQ water. The Pickering emulsion was formed by the Ultra Turrax 10 seconds at low speed followed by 30 seconds at high speed. |
| Results: | The above blue Pickering emulsion settles to the bottom of the vial and can be completely redispersed by tipping the vial 4 times into a horizontal position. This blue Pickering emulsion was used to develop a latent electrostatic image on a dielectric substrate. The image produced a substantial deposition of blue powder in the |

| Formulation of a Pickering Emulsion |
| --- |
| charged areas. The blue powder was removed from the surface, and a visible blue image was seen on the dielectric surface. |

Emulsions tested in the above experiments were prepared using ultrasonic generators.

For commercial production of emulsions according to the invention continuous production may be desirable. Devices which may be used include: An Ultra-Turrax with an inline dispersing unit (also known as a generator) catalogue number 25 KV-25 F-IL that is capable of producing an emulsion 1-5 microns in size. Sonics & Materials Vibra-cell Model-CV-17 Probe System: Power 600 watts, used for emulsification ¼" probe, controlled power and timed output.

Microfluidizer M110-S from Microfluidics Corporation can generate up to 23,000 psi in the emulsification chamber, with a sample size minimum of 14 ml. with >12 ml. recovery. This unit is capable of the production of nanometer size emulsions.

Throughout this specification various indications have been given as to the scope of this invention but the invention is not limited to any one of these but may reside in two or more of these combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The claims defining the invention are as follows:

1. A composition of matter comprising:
   a liquid continuous phase,
   a liquid discontinuous phase which is substantially immiscible in the continuous phase and
   a surfactant,
   wherein the continuous phase has a high volume resistivity, the discontinuous phase is electrically charged and the surfactant is selected to not significantly reduce the volume resistivity of the continuous phase.

2. A composition of matter as in claim 1, wherein the surfactant has a first part which is compatible with the continuous phase and a second part which is compatible with the discontinuous phase.

3. A composition of matter as in claim 1 further comprising in the discontinuous phase a compound selected from the group consisting of a bio-active agent, an activated nucleoside amidite (A, C, G or T), an activated oligonucleotide, a reagent or reactant including an acid or a base, a blocking chemical, a de-blocking chemical, an organic or inorganic derivatisation chemical, a catalyst, a pharmaceutical, a dye, and a pigment.

4. A composition of matter as in claim 1 further comprising a charge control agent.

5. A composition of matter as in claim 4 wherein the charge control agent is selected from the group consisting of an acid and its salts, an organic acid and its salts, an ionic compound, and a zwitterionic compound.

6. A composition of matter as in claim 4 wherein the charge control agent is selected from the group consisting of metallic soaps wherein the metal includes: barium, calcium, magnesium, strontium, zinc, cadmium, aluminium, gallium, lead, chromium, manganese, iron, nickel, zirconium and cobalt and the acid portion is provided by a carboxylic acid, and a phospholipid, or where the continuous phase is a fluoro-chemical the charge control agent comprises a fluorine analogue of the compounds listed above.

7. A composition of matter as in claim 1 wherein the continuous phase is present in the range of about 40 to 99.99 percent by volume, the discontinuous phase is present in a range of from about 0.01 to 60 percent by volume.

8. A composition of matter as in claim 1 wherein the discontinuous phase has a droplet size of from about 100 microns down to 0.2 microns.

9. A composition of matter as in claim 1 wherein the emulsion is a mini-emulsion with a discontinuous phase having a droplet size from 1000 nanometers down to about 50 nanometers.

10. A composition of matter as in claim 1 wherein the emulsion is a micro-emulsion with a discontinuous phase having a droplet size of from about 200 nanometers down to 1 nanometer.

11. An emulsion comprising:
    a continuous phase,
    a discontinuous phase which is immiscible in the continuous phase, and
    a surfactant, the surfactant having a first part which is compatible with the continuous phase and a second part which is compatible with the discontinuous phase,
    wherein the continuous phase has a high volume resistivity, the discontinuous phase is electrically charged and comprises a compound selected from the group consisting of a bio-active agent, an activated nucleoside amidite (A, C, G or T), an activated oligonucleotide, a reagent or reactant including acids and bases, a blocking chemical, a de-blocking chemical, an organic or inorganic derivatisation chemical, a catalyst, a pharmaceutical, a dye, and a pigment, and the surfactant is selected to not significantly reduce the volume resistivity of the continuous phase.

12. A composition of matter as in claim 6 wherein the carboxylic acid is selected from the group consisting of caproic acid, octanoic (caprylic) acid, capric acid, lauric acid, myristic acid, palmitic acid, stearic acid, oleic acid, linolic acid, erucic acid, tallitic acid, resinic acid, naphthenic acid, and succinic acid.

13. A composition of matter as in claim 7 wherein the surfactant is present in a range of about 0.01 to 20 percent by weight.

14. A composition of matter as in claim 4 wherein the charge control agent is present in a range of 0.01 to 10 percent by weight.

15. A composition of matter as in claim 1 wherein the liquid continuous phase is electrically insulative.

16. An emulsion as in claim 11 wherein the continuous phase is electrically insulative.

17. A composition of matter as in claim 1 wherein the continuous phase is selected from the group consisting of a hydrocarbon, a fluoro-chemical, and a silicone fluid.

18. A composition of matter as in claim 17 wherein the hydrocarbon comprises hexane, decalin, cyclohexane, isooctane, heptane, aromatic hydrocarbons, and isodecane.

19. A composition of matter as in claim 17 wherein the fluoro-chemical comprises a linear, cyclic or polycyclic perfluoroalkane, a bis(perfluoroalkyl)alkene, a perfluoroether, a perfluoroalkylamine, a perfluoroalkyl bromide, or a perfluoroalkyl chloride.

20. A composition of matter as in claim 17 wherein the silicone fluid comprises a polyphenylmethyl siloxane, a dimethyl polysiloxane, a polydimethyl siloxane, or a cyclic dimethyl siloxane.

21. A composition of matter as in claim 1 wherein the discontinuous phase of the emulsion is selected from the group consisting of acetone, acetonitrile, cyclohexanone, dibromomethane, dichloromethane, trichloromethane, dimethyl formamide, dioxane, 1,2-dichloroethane, nitromethane, tetrahydrofuran, toluene, decalin, dimethyl formamide, isobutanol, Isopar, Norpar, propylene carbonate, dimethyl sulphoxide, isopropanol/methylene chloride, nitromethane/methanol, nitromethane/isopropanol, trichloromethane/methanol, and isopropanol/methylene chloride.

22. An emulsion including
a liquid continuous phase,
a liquid discontinuous phase which is immiscible in the continuous phase, and
a surfactant, the surfactant having a first part which is compatible with the continuous phase and a second part which is compatible with the discontinuous phase,
wherein the continuous phase has a high volume resistivity, the discontinuous phase is electrically charged and the surfactant is selected to not significantly reduce the volume resistivity of the continuous phase.

23. An emulsion as in claim 22 wherein the continuous phase comprises a liquid which is electrically insulative having a volume resistivity of approximately $1 \times 10^6$ ohm-cm or greater.

24. An emulsion as in claim 22 wherein the continuous phase is selected from the group consisting of a hydrocarbon; a fluoro-chemical; and a silicone fluid.

25. An emulsion as in claim 22 wherein the continuous phase is a gel or highly viscous liquid.

26. An emulsion as in claim 22 wherein the discontinuous phase is non-aqueous and immiscible or substantially insoluble in the continuous phase.

27. An emulsion as in claim 22 wherein the discontinuous phase is selected from the group consisting of a reagent, a solvent which carries an active chemical reagent, and a carrier liquid for a solid or insoluble liquid dispersed in the discontinuous phase.

28. An emulsion as in claim 22 wherein the discontinuous phase of the emulsion is selected from the group consisting of acetone, acetonitrile, cyclohexanone, dibromomethane, dichloromethane, trichloromethane, dimethyl formamide, dioxane, 1,2-dichloroethane, nitromethane, tetrahydrofuran, toluene, decalin, dimethyl formamide, isobutanol, isopar, norpar, propylene carbonate, dimethyl sulphoxide, isopropanol/methylene chloride, nitromethane/methanol, nitromethane/isopropanol, trichloromethane/methanol, and isopropanol/methylene chloride.

29. An emulsion as in claim 22 further including in the discontinuous phase a compound selected from the group consisting of a bio-active agent, an activated nucleoside amidite (A, C, G or T), an activated oligonucleotide, a reagent or reactant including an acid or a base, a blocking chemical, a de-blocking chemical, an organic or inorganic derivatisation chemical, a catalyst, a pharmaceutical, a dye, and a pigment.

30. An emulsion as in claim 22 wherein the surfactant is selected to have a first part which is compatible with the continuous phase and a second part which is compatible with the discontinuous phase.

31. An emulsion as in claim 22 wherein the surfactant is selected from the group consisting of anionic, cationic, non-ionic or amphoteric compounds, polymer surfactant materials, phospholipids, and fluorinated analogues thereof.

32. A composition being an emulsion including:
a continuous phase comprising an insulative liquid,
a discontinuous phase comprising a non-aqueous solvent and a chemical de-protecting reagent in solution in the non-aqueous solvent, and
a surfactant, the surfactant having a first part which is compatible with the continuous phase and a second part which includes a group which is compatible with the discontinuous phase, and
wherein the continuous phase has a high volume resistivity and the discontinuous phase is electrically charged and the surfactant is selected to not significantly reduce the volume resistivity of the continuous phase.

33. A composition as in claim 32 wherein the chemical de-protecting agent is selected from the group consisting of Lewis acids, protonic acids, zinc bromide, titanium tetrachloride, and ceric ammonium nitrate, dilute mineral acids, trichloroacetic acid, dichloroacetic acid, benzenesulphonic acid, trifluoroacetic acid, difluoroacetic acid, perchloric acid, orthophosphoric acid, toluenesulphonic acid, dodecylbenzene sulphonic acid, dinonylnaphthyldisulphonic acid, dinonylnaphthylsulphonic acid, perfluorooctanoic acid and diphenyl acid phosphate.

34. A composition as in claim 32 wherein the continuous phase is a fluorochemical.

35. A composition as in claim 34 wherein the fluorochemical is a perfluoro-carbon selected from the group consisting of perfluoro-octane, linear, cyclic or polycyclic perfluoroalkylalkane, bis(perfluoroalkyl) alkene, perfluoroether, perfluoroamine, perfluoroalkyl bromide and perfluoroalkyl.

36. A composition as in claim 32 wherein the continuous phase is a silicone fluid or an organic liquid.

37. A composition as in claim 32 wherein the discontinuous phase of the emulsion is selected from the group consisting of acetone, acetonitrile, cyclohexanone, dibromomethane, dichloromethane, trichloromethane, dimethyl formamide, dioxane, 1,2-dichloroethane, nitromethane, tetrahydrofuran, toluene, decalin, dimethyl formamide, isobutanol, propylene carbonate, dimethyl sulphoxide, isopropanol/methylene chloride, nitromethane/methanol, nitromethane/isopropanol, trichloromethane/methanol, and isopropanol/methylene chloride.

38. A composition as in claim 33 wherein the surfactant is a fluorochemical-hydrocarbon selected from the group consisting of perfluorocarbon-propoxypropylene, fluoro-alkyl citrate, perfluoroalkyl-alkylene mono- or di-morpholinophosphate and fluorinated phospholipids, alcohols, and polyols or polyhydroxylated or aminated derivatives.

39. A composition as in claim 32 wherein the surfactant is a non-ionic, anionic, cationic, amphoteric or zwitterionic surfactant.

40. A composition as in claim 32 further including a charge control agent.

41. A composition as in claim 40 wherein the charge control agent is selected from the group consisting of an acid and its salts, an organic acid and its salts, an ionic compound, and a zwitterionic compound.

42. An composition as in claim 40 wherein the charge control agent is selected from the group consisting of metallic soaps wherein the metal includes: barium, calcium, magnesium, strontium, zinc, cadmium, aluminium, gallium, lead, chromium, manganese, iron, nickel, zirconium and cobalt and the acid portion is provided by a carboxylic acid, and a phospholipid, or where the continuous phase is a fluorochemical the charge control agent includes a fluorine analogue of the compounds listed above.

* * * * *